United States Patent
Nishijima (10) Patent No.: US 9,882,496 B2
(45) Date of Patent: Jan. 30, 2018

(54) LINEARLY APPROXIMATED HERSHEY'S KISS FREQUENCY SWEEP FOR SWITCHING POWER SUPPLY DEVICE

(71) Applicant: Fuji Electric Co., Ltd., Kanagawa (JP)

(72) Inventor: Kenichi Nishijima, Nagano (JP)

(73) Assignee: FUJI ELECTRIC CO., LTD., Kanagawa (JP)

( * ) Notice: Subject to any disclaimer, the term of this patent is extended or adjusted under 35 U.S.C. 154(b) by 0 days.

(21) Appl. No.: 15/258,128

(22) Filed: Sep. 7, 2016

(65) Prior Publication Data
US 2017/0099004 A1    Apr. 6, 2017

(30) Foreign Application Priority Data

Oct. 6, 2015  (JP) .................................. 2015-198401

(51) Int. Cl.
*H02M 1/15*    (2006.01)
*H02M 3/335*   (2006.01)
(Continued)

(52) U.S. Cl.
CPC ......... *H02M 3/33523* (2013.01); *H02M 1/08* (2013.01); *H02M 1/36* (2013.01); *H02M 1/44* (2013.01); *H02M 2001/0009* (2013.01)

(58) Field of Classification Search
CPC ............ H02M 1/08; H02M 1/14; H02M 1/15; H02M 1/36
(Continued)

(56) References Cited

U.S. PATENT DOCUMENTS

| 5,488,627 A | 1/1996 | Hardin et al. |
| 7,953,566 B2 | 5/2011 | Yoshinaga |

(Continued)

FOREIGN PATENT DOCUMENTS

| JP | 2009-004868 A | 1/2009 |
| JP | 2011-176413 A | 9/2011 |
| WO | 2006/019196 A1 | 2/2006 |

OTHER PUBLICATIONS

Matsumoto et al., "Determination Method of Optimal Modulating Waveform for Spread Spectrum Clock Generation." The Institute of Electronics, Information and Communication Engineers, Technical Report of IEICE, Electromagnetic Compatibility, Jul. 30, 2004, vol. 104, No. 232, pp. 15-22.

(Continued)

*Primary Examiner* — Jeffrey Sterrett
(74) *Attorney, Agent, or Firm* — Chen Yoshimura LLP (57) ABSTRACT

A conducted EMI noise reduction effect close to that achieved by using an optimal modulating waveform as a modulating wave is achieved when employing a frequency spreading technique as a measure against noise when a conducted EMI standard is extended to a low-frequency range. A triangular wave/Hershey's Kiss approximation signal generating unit and a triangular wave generation control unit generate a fundamental triangular wave by a transistor charging a capacitor with a current and a transistor discharging the current from the capacitor. A slope switching signal generating unit generates signals expressing the start and end of a charge period and the start and end of a discharge period. An additional charge or additional discharge is carried out in response to the signals turning a transistor on, and the slope of the triangular wave temporarily increases in that period only.

7 Claims, 7 Drawing Sheets

(51) Int. Cl.
  *H02M 1/08*   (2006.01)
  *H02M 1/36*   (2007.01)
  *H02M 1/44*   (2007.01)
  *H02M 1/00*   (2006.01)
(58) Field of Classification Search
  USPC .................................. 363/39, 41, 49, 95, 97
  See application file for complete search history.

(56) References Cited

U.S. PATENT DOCUMENTS

| | | | |
|---|---|---|---|
| 8,558,497 B2* | 10/2013 | Wright | H03K 7/08 318/34 |
| 2011/0204940 A1 | 8/2011 | Kanda | |
| 2016/0359418 A1* | 12/2016 | Kawashima | H02M 1/44 |
| 2017/0093407 A1* | 3/2017 | Kim | H03L 7/099 |
| 2017/0099004 A1* | 4/2017 | Nishijima | H02M 1/08 |

OTHER PUBLICATIONS

Yamada et al., "Estimation of EMI Reduction by Spread Spectrum Clock", The Institute of Electronics, Information and Communication Engineers, Technical Report of IEICE, 2001, pp. 37-42. (English abstract included as a concise explanation of relevance.).

Guidance for Selection of Oscillator (2/3), EDN Japan, http://ednjapan.com//edn/articles/0906/01/news106_2.html, FIG 4 (A translation of FIG. 4 of the document is attached as a concise explanation of relevance.).

\* cited by examiner

LINEARLY APPROXIMATED HERSHEY'S KISS FREQUENCY SWEEP FOR SWITCHING POWER SUPPLY DEVICE

BACKGROUND OF THE INVENTION

Technical Field

The present invention relates to a control circuit for a switching power supply device and to a switching power supply device, and particularly relates to a control circuit for a switching power supply device and to a switching power supply device that reduce the occurrence of noise by introducing jitter (frequency spreading) to a switching frequency.

Background Art

A switching power supply device rectifies and smoothes a commercial AC voltage and switches the smoothed voltage using a switching element in order to generate a prescribed DC voltage and output the voltage to a load. When the switching element is switched at a prescribed switching frequency, higher-order harmonics that take the prescribed switching frequency as their fundamental waves are produced at the same time. These higher-order harmonics radiate outside the switching power supply device as radiated EMI (electromagnetic interference) noise and conducted EMI noise. Such EMI noise negatively affects the operations of other electronic devices, and thus standards set limits ensuring that no more than a set amount of EMI noise is produced. Radiated EMI noise, which is radiated outside the switching power supply device as radio waves, is limited to a measured frequency range of 30 MHz to 1 GHz. Meanwhile, conducted EMI noise, which escapes to the exterior from a power supply cord of the switching power supply device connected to a commercial AC voltage, is limited to a measured frequency range of 150 kHz to 30 MHz.

With respect to current conducted EMI standards, there is discussion, in the field of power electronics, of expanding the measured frequency range of EMI noise to lower frequencies than 150 kHz to suppress conducted EMI noise even in lower measured frequency ranges. Specifically, setting the lower limit frequency of the measured frequency range to 9 kHz is being considered.

If the measured frequency range is expanded, new conducted EMI noise reduction measures are necessary in that 9 kHz to 150 kHz measured frequency range. In other words, if the switching frequency is, for instance, the typically-used 65 kHz, the fundamental wave and the second-order harmonic thereof (130 kHz) are also subject to measurement. Moreover, while the energy of the switching frequency is greatest at the fundamental wave thereof and decreases progressively at the second- and third-order harmonics, the fundamental wave and the second-order harmonic, where the noise energy is high, are newly subject to measurement. This means that stronger measures for noise reduction are necessary compared to current standards, in which noise reduction measures only need to be taken from the third-order harmonic of the switching frequency, which has an even lower energy than the second-order harmonic.

Typical measures for reducing such conducted EMI noise in a switching power supply device include providing an EMI filter at a location where an AC voltage is received, and taking circuitry-related measures within a power supply IC (Integrated Circuit) that controls the switching power supply device.

An EMI filter is configured by combining inductor and capacitor components. In an EMI filter, the components have higher constants as the frequency to be suppressed decreases, and conversely have lower constants as the frequency to be suppressed increases. Expanding the measured frequency range to frequencies lower than those in current standards increases the constants of the components. This means that the components will be larger, which makes it difficult to fit the components into the spaces available in current EMI filters, increases costs, and so on. As such, implementing measures for reducing conducted EMI noise in the 9 kHz to 150 kHz measured frequency range on the power supply IC side eliminates the need for such measures on the EMI filter side; and even if EMI filter-side measures are necessary, the scale of such measures can be kept to a minimum.

As opposed to measures for reducing conducted EMI noise using an EMI filter, a technique known as spread spectrum clocking or spread spectrum clocking is known as a measure for reducing conducted EMI noise using a power supply IC (see Patent Document 1, for example). This introduces jitter (frequency spreading) to the switching frequency and spreads the noise so as not to be concentrated at a specific frequency. Although the amount of power radiated itself does not change, the peak level of the spectrum is reduced, which reduces the noise energy.

Figure 6:
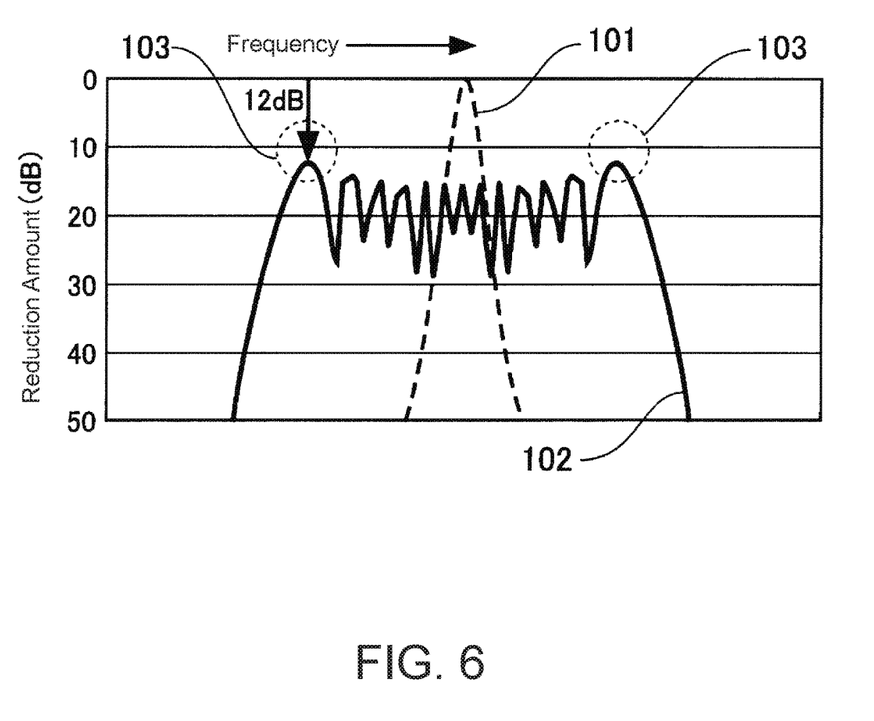
FIG. 6 is a diagram illustrating an example of a spectral distribution before and after switching frequency modulation.

FIG. 6 is a diagram illustrating an example of a spectral distribution before and after switching frequency modulation. In FIG. 6, the horizontal axis represents frequency and the vertical axis represents a reduction amount. In this diagram, the reduction amount is indicated as an amplitude of 0 dB (decibels) before modulation.

It can be seen from FIG. 6 that a pre-modulation spectrum 101, which is represented by the broken line, is present in a narrow frequency band concentrated at a central frequency of a high-frequency component. When this spectrum 101 is modulated through spread spectrum clocking, the spectrum is spread throughout a given frequency band, resulting in the spectrum 102 represented by the solid line. In the example illustrated here, the spectrum 102 has a peak 12 dB lower than the peak of the spectrum 101, and thus it can be seen that the spread spectrum clocking technique provides a conducted EMI noise reduction effect of at least 12 dB.

Although the spectrum 102 illustrated here uses a sine wave as the modulating signal for determining the modulating frequency, note that other waveforms aside from sine waves are sometimes used. In actuality, a triangular wave is typically used as the modulating frequency signal in switching power supply devices, and although the spectral distribution obtained in the case where a triangular waveform is used does differ from the spectrum 102 illustrated in FIG. 6, it is generally a similar spectral distribution.

In other words, in the spectral distribution obtained by using a triangular waveform for the modulating frequency, protruding areas 103 are formed by the amplitude near both ends overshooting the amplitude near the center, in the same manner as in the spectral distribution of the spectrum 102. Such protruding areas 103 hamper the conducted EMI noise reduction effects, and thus the conducted EMI noise reduction effects can be further increased by eliminating such protruding areas 103.

A technique for eliminating the stated protruding areas appearing near both ends of a frequency-spread spectrum by employing a waveform having a special shape as the waveform of the modulating frequency is known (see Non-Patent Document 1, for example).

Figure 7A:
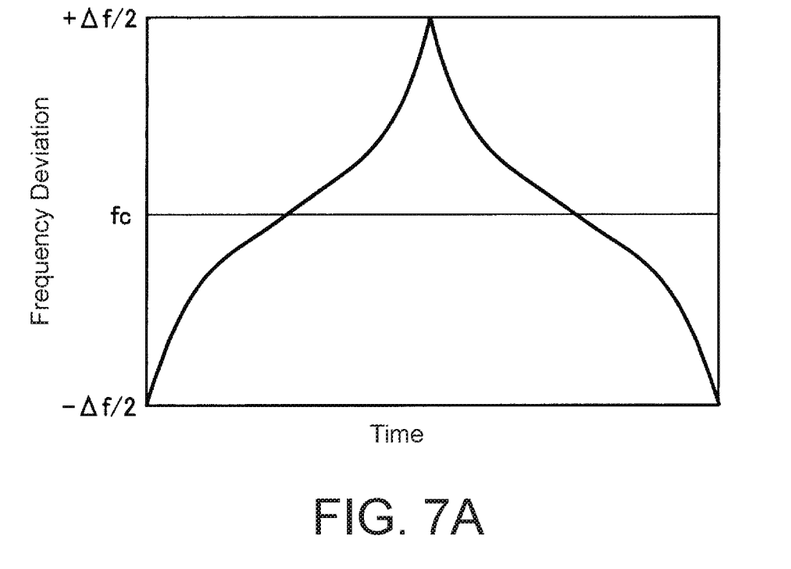
FIGS. 7A and 7B are diagrams illustrating a modulating waveform and a spectrum in a frequency spreading technique, where FIG. 7A indicates an optimal modulating waveform and FIG. 7B indicates an example of a spectral distribution obtained by modulating the clock frequency with the optimal modulating waveform.
Figure 7B:
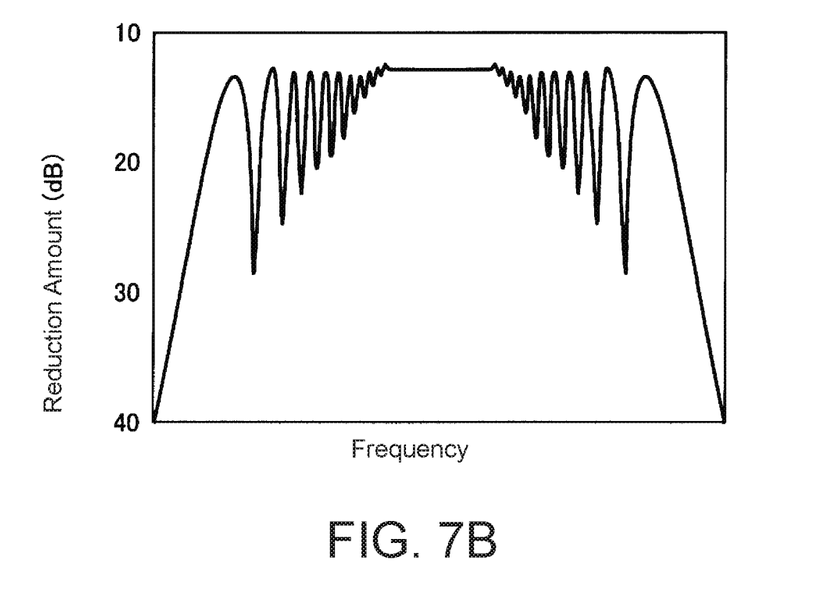

FIGS. 7A and 7B are diagrams illustrating the waveform of a modulating signal (a modulating waveform) and a spectrum in this frequency spreading technique, where FIG. 7A indicates an optimal modulating waveform and FIG. 7B indicates an example of a spectral distribution obtained by modulating the clock frequency with the optimal modulating waveform.

The optimal modulating waveform indicated in FIG. 7A is a waveform having a curve referred to as a "Hershey's Kiss" (registered trademark). This Hershey's Kiss waveform has a special shape that cannot be formed easily, and thus in the field of signal circuits, this waveform is formed using a dedicated IC known as an SSCG (Spread Spectrum Clock Generator).

Using this Hershey's Kiss waveform as a clock modulating waveform eliminates overshoot near both sides of the spectrum and smoothes the spectrum, as indicated in FIG. 7B. As such, a greater effect of reducing conducted EMI noise can be achieved through the frequency spreading technique, and thus the same conducted EMI noise reduction effect can be achieved even when the technique is applied in a switching power supply device.

RELATED ART DOCUMENTS

Patent Documents

Patent Document 1: WO 2006/019196 (FIG. 2)

Non-Patent Documents

Non-Patent Document 1: Y. Matsumoto, K. Fujii, and A. Sugiura. "Determination method of optimal modulating waveform for spread spectrum clock generation." Institute of Electronics, Information and Communication Engineers Technical Report, Electromagnetic Compatibility. Jul. 30, 2004, Vol. 104, No. 232, pp. 15-22.

SUMMARY OF THE INVENTION

However, using a dedicated IC only for obtaining a Hershey's Kiss waveform, forming a complicated and large-scale Hershey's Kiss waveform generating circuit instead of a triangular waveform generating circuit having a simple configuration in a power supply IC for control, or the like in switching power supply devices is problematic in that in reality, it is difficult to do so.

In consideration of the above, a primary aim of the present invention is to provide a control circuit for a switching power supply device, and a switching power supply device, that are capable of achieving a conducted EMI noise reduction effect similar to that achieved in the case where a Hershey's Kiss waveform is used as a modulating wave.

To achieve these and other advantages and in accordance with the purpose of the present invention, as embodied and broadly described, in one aspect, the present disclosure provides a control circuit for a switching power supply device that carries out control for generating a prescribed DC voltage by switching a switching element connected to an input voltage, the control circuit including: an oscillation circuit that generates a switching signal to turn on and off the switching element; and a modulating signal generating circuit that generates and supplies a modulating signal for frequency modulation to the oscillation circuit, wherein the oscillation circuit modulates the switching signal in accordance with the modulating signal supplied by the modulating signal generating circuit so as to perform frequency sweep on switching of the switching element, and wherein the modulating signal linearly approximates a Hershey's Kiss modulating waveform.

In another aspect, the present disclosure provides a switching power supply device, including; a switching element configured to be connected to an input voltage; and a control circuit that carries out control for generating a prescribed DC voltage by switching a switching element connected to an input voltage, wherein the control circuit includes an oscillation circuit that generates a switching signal to turn on and off the switching element, and a modulating signal generating circuit that generates and supplies a modulating signal for frequency modulation to the oscillation circuit, wherein the oscillation circuit modulates the switching signal in accordance with the modulating signal supplied by the modulating signal generating circuit so as to perform frequency sweep on switching of the switching element, and wherein the modulating signal linearly approximates a Hershey's Kiss modulating waveform.

The control circuit for a switching power supply device and the switching power supply device configured as described above modulate the switching signal from the oscillation circuit using the Hershey's Kiss approximation signal, and thus have an advantage of maximizing a conducted EMI noise reduction effect while using a simple configuration. It is therefore not necessary to increase the performance of an EMI filter; and even if it is necessary to increase the performance of the EMI filter, the scale of such an increase can be kept to a minimum.

It is to be understood that both the foregoing general description and the following detailed description are exemplary and explanatory, and are intended to provide further explanation of the invention as claimed.

DETAILED DESCRIPTION OF EMBODIMENTS

A case where an embodiment of the present invention is applied in a flyback-type switching power supply device having a small number of components and capable of handling a broad input voltage range will be described in detail hereinafter with reference to the drawings. In the following descriptions, the same reference numerals may be used for both terminal names and for the voltages, currents, signals, and so on at those terminals.

Figure 1:
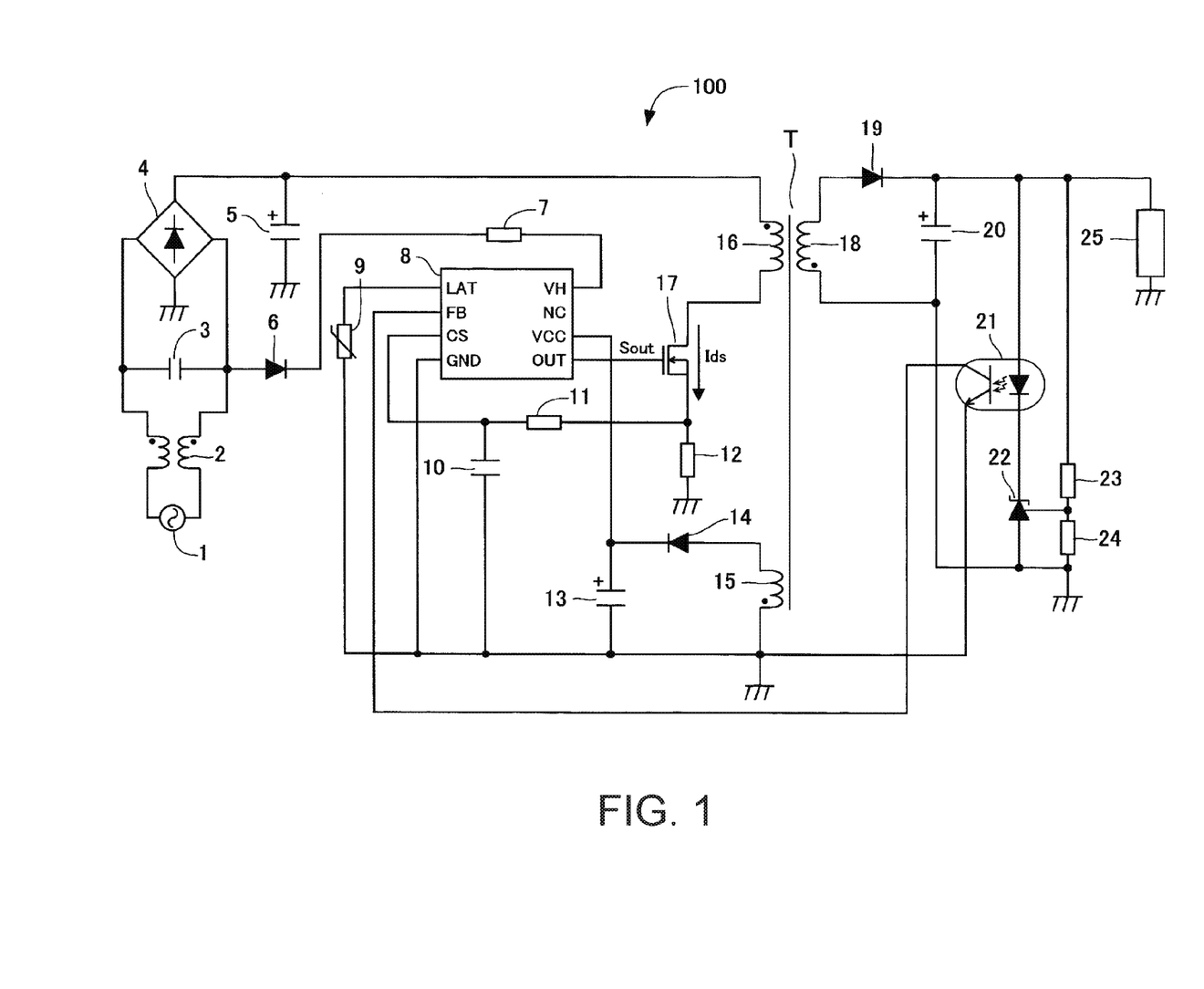
FIG. 1 is a circuit diagram illustrating a representative example of the configuration of a switching power supply device according to an embodiment.

FIG. 1 is a circuit diagram illustrating a representative example of the configuration of a switching power supply device according to the embodiment.

This switching power supply device 100 has a control IC 8, which is a control circuit for PWM (Pulse Width Modulation) control, and includes at least a transformer T, a diode 19, a capacitor 20, and a switching element as illustrated in the drawing. Here, a MOSFET (Metal Oxide Semiconductor Field Effect Transistor) 17 is used as the switching element.

A commercial AC power supply 1 is supplied to a diode bridge 4 via a common mode choke coil 2 and an X capacitor 3 constituting an input noise filter, and is full-wave rectified by the diode bridge 4.

A capacitor 5 is provided between the diode bridge 4 and a ground, and has a function of maintaining an input voltage for supplying energy to an output in a stable manner and a function of absorbing switching noise produced by switching operations performed by the MOSFET 17. Meanwhile, a diode 6 half-wave rectifies the AC power supply 1, supplies power to a VH terminal of the control IC 8 via a current limiting resistor 7, and secures a supply of power to the control IC 8 at startup. The current limiting resistor 7 limits an input current supplied to the VH terminal.

A thermistor 9 is connected to a LAT terminal of the control IC 8 to provide the control IC 8 with protection against latch overheating. Additionally, a voltage of a sense resistor 12 is inputted into a CS terminal of the control IC 8 via a noise filter constituted of a capacitor 10 and a resistor 11.

A VCC terminal of the control IC 8 is connected to one end of a capacitor 13, and is connected to an auxiliary coil 15 of the transformer T via a diode 14. The capacitor 13 holds a power supply voltage supplied to the control IC 8 during PWM control operations. Meanwhile, the diode 14 is an element for supplying a voltage to the VCC terminal from the auxiliary coil 15 after startup.

A primary coil 16 of the transformer T is connected at one end to the capacitor 5 and at the other end to the drain terminal of the MOSFET 17. The source terminal of the MOSFET 17, meanwhile, is grounded via the sense resistor 12, and the sense resistor 12 detects a drain current Ids flowing in the MOSFET 17. In other words, an ON current of the MOSFET 17 is converted to a voltage signal of a magnitude proportional thereto by the sense resistor 12, and the voltage signal (a current detection signal) is inputted to the CS terminal of the control IC 8 via the noise filter.

A secondary coil 18 of the transformer T is connected at one end to the diode 19 and is furthermore grounded via the capacitor 20. A terminal voltage of the capacitor 20 is an output voltage supplied to a load 25, and information regarding this voltage is communicated from the secondary side to the primary side by a photocoupler 21. The photocoupler 21 is connected in series to a shunt regulator 22. A connection point between resistors 23 and 24 that divide the output voltage is connected to the shunt regulator 22, and the shunt regulator 22 compares the value of the divided output voltage to an internal reference voltage. Error information of the output voltage on the secondary side with respect to the reference voltage is converted into a current signal by the shunt regulator 22, and this current signal flows in an LED (Light Emitting Diode) constituting the photocoupler 21 and is converted into an optical signal. This optical signal is communicated to a phototransistor constituting the photocoupler 21, and a signal resulting from photoelectric conversion by the phototransistor is inputted into an FB terminal of the control IC 8. In this manner, information of the output voltage on the secondary side, or in other words, load information, is communicated to the control IC 8 on the primary side.

In the switching power supply device 100 configured using the control IC 8 for PWM control, a rectified voltage of an AC input voltage is transformed into a prescribed DC voltage in the transformer T by controlling switching operations of the MOSFET 17.

In the control IC 8 configured using an IC circuit, the load information outputted to the load 25 on the secondary side of the transformer T is detected by a signal fed back to the FB terminal of the control IC 8 via the shunt regulator 22 and the photocoupler 21 as described above.

Meanwhile, the drain current Ids in the MOSFET 17 is converted to a voltage by the sense resistor 12, and that voltage is then detected by the control IC 8 at the CS terminal. The control IC 8 determines an output signal outputted from an OUT terminal by directly or indirectly comparing the FB terminal voltage and the CS terminal voltage. Variably controlling an on period of the MOSFET 17 with this output signal makes it possible to carry out PWM control of the switching power supply, which in turn makes it possible to adjust the supply of power to the load 25 on the secondary side.

Figure 2:
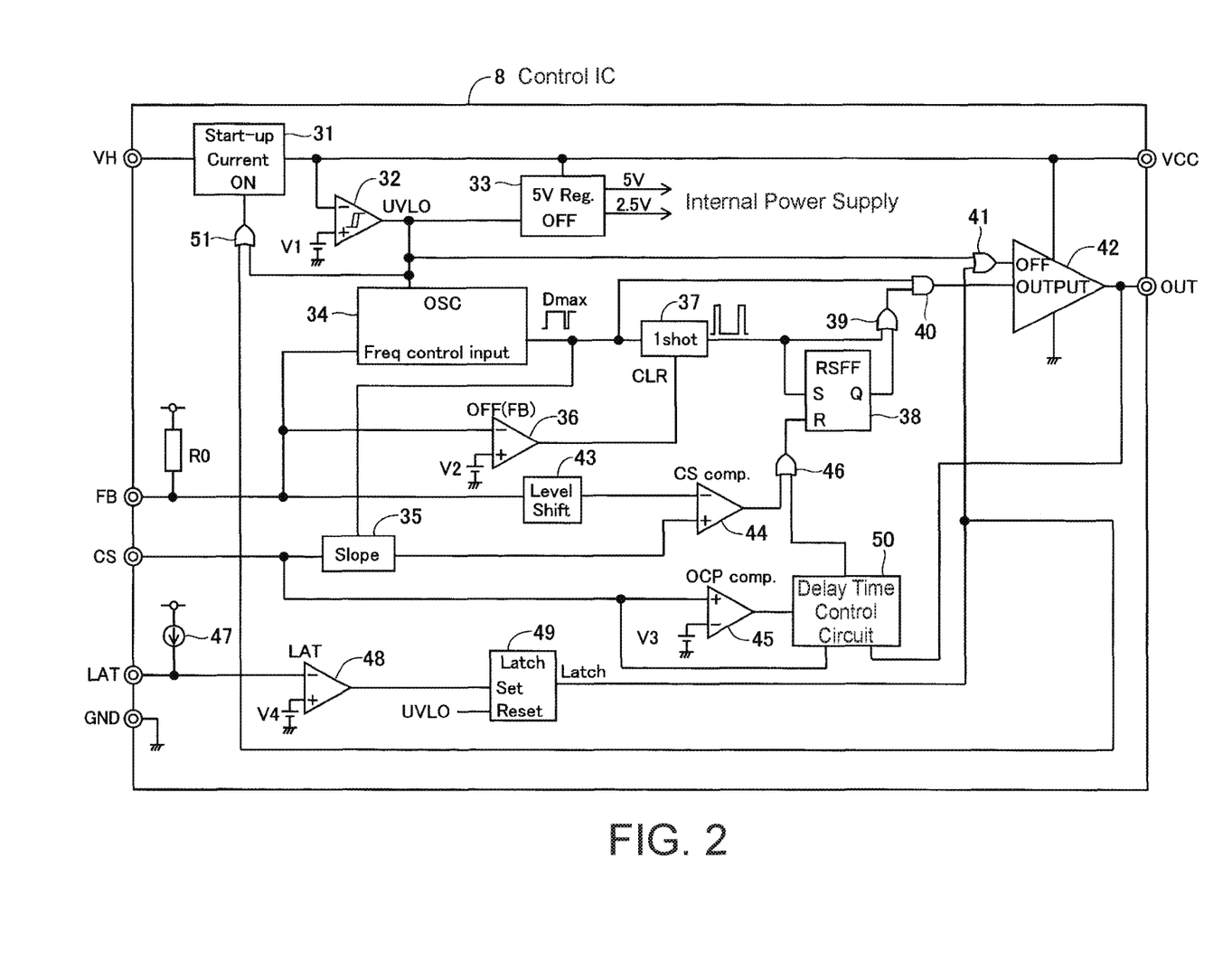
FIG. 2 is a block diagram illustrating an example of the circuit configuration of a control IC.

FIG. 2 is a block diagram illustrating an example of the circuit configuration of the control IC 8.

In the control IC 8, a startup circuit 31 supplies a current from the VH terminal to the VCC terminal upon startup. In the control IC 8, when the AC power supply 1 is applied, a current flows from the VH terminal, through the startup circuit 31, and to the VCC terminal. As a result, the capacitor 13 externally connected to the VCC terminal is charged and a voltage value thereof rises.

An undervoltage lockout circuit (UVLO) 32 is connected to the VCC terminal and a reference power supply V1. With the undervoltage lockout circuit 32, a UVLO signal, which is the output of the undervoltage lockout circuit 32, goes to L (Low) level when the voltage value at the VCC terminal becomes greater than or equal to the reference power supply V1. An internal power supply circuit 33 is started as a result, and power is supplied to the various circuits within the control IC 8. Conversely, when the voltage at the VCC terminal does not reach the reference power supply V1 or the voltage at the VCC terminal drops below the reference power supply V1, the undervoltage lockout circuit 32 sets the UVLO signal to H (High) level and stops the operations of the control IC 8.

An oscillator (OSC) 34 is connected to the FB terminal, and has a frequency modulation function that spreads a frequency in order to reduce EMI noise produced by the switching operations of the MOSFET 17. The oscillator 34 determines the frequency at which the control IC 8 operates the MOSFET 17, and has, in addition to the stated frequency modulation function, a variable frequency function for reducing an oscillation frequency during times of low load. The oscillator 34 outputs an oscillation signal (duty max signal) Dmax.

The oscillation signal Dmax is a signal that stays at H level for a long time and only goes to L level for a short time in each period, and that period corresponds to a switching period of the switching power supply. A ratio between that period and the H level time within the period provides a maximum time ratio (duty max) of the switching power supply. Meanwhile, a slope compensation circuit 35 is connected to the CS terminal and has a function for preventing subharmonic oscillation, which will be described later.

An input terminal of an FB comparator 36 is connected to the FB terminal and a reference power supply V2. When the voltage at the FB terminal drops below the reference power supply V2, the FB comparator 36 determines that the load power is low. The FB comparator 36 then stops the switching operations by outputting a clear signal CLR to a one-shot circuit 37 in a later stage and stopping the output from the one-shot circuit 37. Meanwhile, when the voltage at the FB terminal rises above the reference power supply V2, the FB comparator 36 starts the switching operations. Through this, the FB comparator 36 implements a burst operation that temporarily stops the switching operations during times of low load.

The one-shot circuit 37 generates a set pulse for an RS flip-flop 38 in a later stage, using the rise of the oscillation signal Dmax from the oscillator 34 as a trigger. This set pulse also serves as a blanking signal that prevents the MOSFET 17 from erroneously turning off in response to noise arising at the CS terminal when the MOSFET 17 turns on. The one-shot circuit 37 does not output the set pulse to the RS flip-flop 38 while the clear signal CLR is being inputted at H level.

The RS flip-flop 38 generates a PWM signal along with an OR gate 39 and an AND gate 40. In other words, the OR gate 39 generates a logical sum (OR) signal of two output signals, namely the output signal from the one-shot circuit 37 and the output signal from the RS flip-flop 38, that are being inputted.

Although the output signal from the OR gate 39 basically serves as the PWM signal, the maximum duty of the PWM signal is further determined by the AND gate 40 on the basis of the oscillation signal Dmax from the oscillator 34.

The UVLO signal outputted from the undervoltage lockout circuit 32 is supplied to a drive circuit (OUTPUT) 42 via an OR gate 41 so as to control whether or not to permit the drive circuit 42 to operate. The drive circuit 42 controls the switching of the MOSFET 17 on the basis of a switch signal Sout outputted from the drive circuit 42 via the OUT terminal. In other words, the output of the drive circuit 42 is turned off when the voltage at the VCC terminal is low and the UVLO signal is at H level (in other words, a signal turning the MOSFET 17 off is outputted). Conversely, when the voltage at the VCC terminal is high and the UVLO signal is at L level, and an output signal from a latch circuit 49 is at L level, the drive circuit 42 controls the switching of the MOSFET 17 in accordance with the output signal from the AND gate 40.

A level shift circuit 43 has a function for shifting the level of the voltage at the FB terminal to a voltage range that can be inputted to a CS comparator 44, and an output signal thereof is supplied to an inverting input terminal (−) of the CS comparator 44. An output signal from the slope compensation circuit 35 is supplied to a non-inverting input terminal (+) of the CS comparator 44. Note that an internal power supply voltage is connected to the FB terminal via a resistor R0, and the resistor R0 serves as a load resistor (pull-up resistor) of the phototransistor constituting the photocoupler 21. As a result, the voltage at the FB terminal is a voltage dropped by an amount equivalent to the voltage drop from the internal power supply circuit 33 provided by the resistor R0, and the magnitude of an error signal obtained by amplifying a difference between the voltage applied to the load 25 connected to the switching power supply device 100 and the reference voltage is detected.

Note that the error signal (the voltage at the FB terminal) is a signal in which a higher value indicates a heavier load.

A voltage at the CS terminal, which has been subjected to slope compensation for preventing the later-described subharmonic oscillation, is compared with the level-shifted voltage at the FB terminal by the CS comparator 44, and an off timing of the MOSFET 17 is determined.

Additionally, an OCP comparator 45 that determines an overcurrent detection level of the MOSFET 17 is connected to the CS terminal of the control IC 8. A non-inverting input terminal (+) of the OCP comparator 45 is connected to the CS terminal and an inverting input terminal (−) of the OCP comparator 45 is connected to a reference power supply V3, and the overcurrent detection level of the MOSFET 17 is determined.

An off signal from the CS comparator 44, and an off signal from the OCP comparator 45 whose delay time has been adjusted by a delay time control circuit 50, are both supplied to a reset terminal of the RS flip-flop 38 via an OR gate 46.

Note that a current from a current source 47 is supplied to the thermistor 9 via the LAT terminal. A LAT comparator 48 is connected to the LAT terminal and a reference power supply V4, and upon detecting that a voltage at the LAT terminal (that is, a voltage at the thermistor 9) has dropped below the voltage of the reference power supply V4, determines a state of overheating and outputs a set signal to the latch circuit 49.

In response to the set signal from the LAT comparator 48, the latch circuit 49 outputs an H level latch signal Latch to the OR gate 41 and an OR gate 51. The drive circuit 42 turns off and the startup circuit 31 turns on as a result. Meanwhile, the UVLO signal from the undervoltage lockout circuit 32 is supplied to the reset terminal of the latch circuit 49, and the latched state is canceled when a potential at the VCC terminal drops.

When the internal power supply circuit 33 starts up and power is supplied to internal circuits, a voltage is applied to the phototransistor constituting the photocoupler 21 via the resistor R0 and the FB terminal, and the voltage at the FB terminal rises.

Upon the voltage signal at the FB terminal becoming greater than or equal to a set voltage value, the oscillation signal Dmax is outputted from the oscillator 34, and the set pulse is outputted to the RS flip-flop 38 from the one-shot circuit 37 having been triggered by the rise of the oscillation signal Dmax.

This set pulse is inputted to the OR gate 39 along with the output signal from the RS flip-flop 38. The output signal from the OR gate 39 is outputted to the gate terminal of the MOSFET 17 from the OUT terminal as a PWM signal, through the AND gate 40 and the drive circuit 42. This output signal functions as the switch signal Sout and drives the MOSFET 17.

As a result, the MOSFET 17 is turned on by the rise of the oscillation signal Dmax. Note that a logical sum of the output signal from the RS flip-flop 38 and the set pulse from the one-shot circuit 37 is taken in order to prevent the RS flip-flop 38 from being reset by noise arising at the CS terminal when the MOSFET 17 turns on, and the MOSFET 17 turning off immediately after turning on, as described above.

When the MOSFET 17 turns on, the drain current Ids flows in the sense resistor 12, and thus the voltage at the CS terminal of the control IC 8 rises. Then, when the voltage at the CS terminal, which has been subjected to slope compensation by the slope compensation circuit 35 of the control IC 8, reaches a voltage obtained by the level shift circuit 43 level-shifting the voltage at the FB terminal, a reset signal is outputted from the CS comparator 44 to the RS flip-flop 38 via the OR gate 46.

Resetting the RS flip-flop 38 causes the output from the OR gate 39 to go to L level (during normal operations, the set pulse from the one-shot circuit 37 is at L level at this point in time). The output from the AND gate 40 also goes to L level as a result, and thus the MOSFET 17 is turned off by the switch signal Sout.

The MOSFET 17 can be turned off even if the load 25 connected to the switching power supply device has become extremely heavy and the voltage value fed back to the FB terminal of the control IC 8 is outside a control range (on a high-voltage side). In other words, the OCP comparator 45 compares the value of the voltage at the CS terminal with the value of the reference power supply V3, and the MOSFET 17 is turned off in the case where the value of the voltage at the CS terminal is greater than or equal to the value of the reference power supply V3.

Before the CS comparator 44 compares the voltage obtained by level-shifting the voltage at the FB terminal with the voltage at the CS terminal, the voltage at the CS terminal is subjected to slope compensation, in which the slope compensation circuit 35 adds a slope compensation voltage proportional to the on time of the MOSFET 17.

Generally speaking, if the MOSFET 17 is operating in a normal state, the magnitude of a current flowing in the MOSFET 17 at the beginning of each switching period is constant. However, if the duty of the MOSFET 17 (on-time ratio=on period/switching period) rises too much, the current will no longer be constant at the beginning of each switching period, and the state of the current flowing in the MOSFET 17 will vary from switching period to switching period. When such a phenomenon arises, the current flowing in the MOSFET 17 enters a state in which a low-frequency signal overlaps the switching frequency signal.

Such oscillation at a low frequency is known as subharmonic oscillation, and there are conditions under which such subharmonic oscillation arises. Subharmonic oscillation can be prevented by using slope compensation, which overlaps a signal that increases monotonically over the voltage at the CS terminal, to ensure such conditions are not established.

Here, in the switching power supply device 100, the oscillator 34 of the control IC 8 generates the oscillation signal Dmax for causing the MOSFET 17 to carry out switching operations. Typically, 65 kHz, 25 kHz, and frequencies therebetween are used. In other words, when the load 25 is a heavy load, operations are carried out with the switching frequency fixed at 65 kHz, and the frequency is varied from 65 kHz to 25 kHz as the load 25 lightens. When the frequency drops to 25 kHz, the frequency is fixed at 25 kHz, preventing the frequency from dropping to an audible frequency and producing noise in the transformer T. Thus lowering the operating frequency as the load lightens in this manner makes it possible to increase the efficiency of the switching power supply device 100.

An example of the configuration of the oscillator 34 in the control IC 8 will be described next. The oscillator 34 uses a Hershey's Kiss waveform, which is conventionally only used to reduce radiated EMI noise in a high-frequency range of 30 MHz or more, as a modulating signal for frequency spreading. However, the oscillator 34 generates a waveform that approximates a Hershey's Kiss waveform in order to minimize the scale of the circuit configuration necessary for generating the Hershey's Kiss waveform. This approximated waveform exploits a property of the Hershey's Kiss waveform in which there are high rates of change (slopes) near a maximum frequency deviation (+Δf/2) and a minimum frequency deviation (−Δf/2). In other words, a waveform that linearly approximates a Hershey's Kiss curved waveform is obtained by switching among linear slopes so that the slope of a triangular wave increases near areas where the frequency deviation is at a maximum and at a minimum. To that end, the oscillator 34 includes a Hershey's Kiss approximation signal generating circuit 60 that generates a Hershey's Kiss approximation waveform for the modulating signal, and a voltage-controlled oscillation circuit 70 that is inputted with the Hershey's Kiss approximation signal and generates the oscillation signal Dmax.

Figure 3:
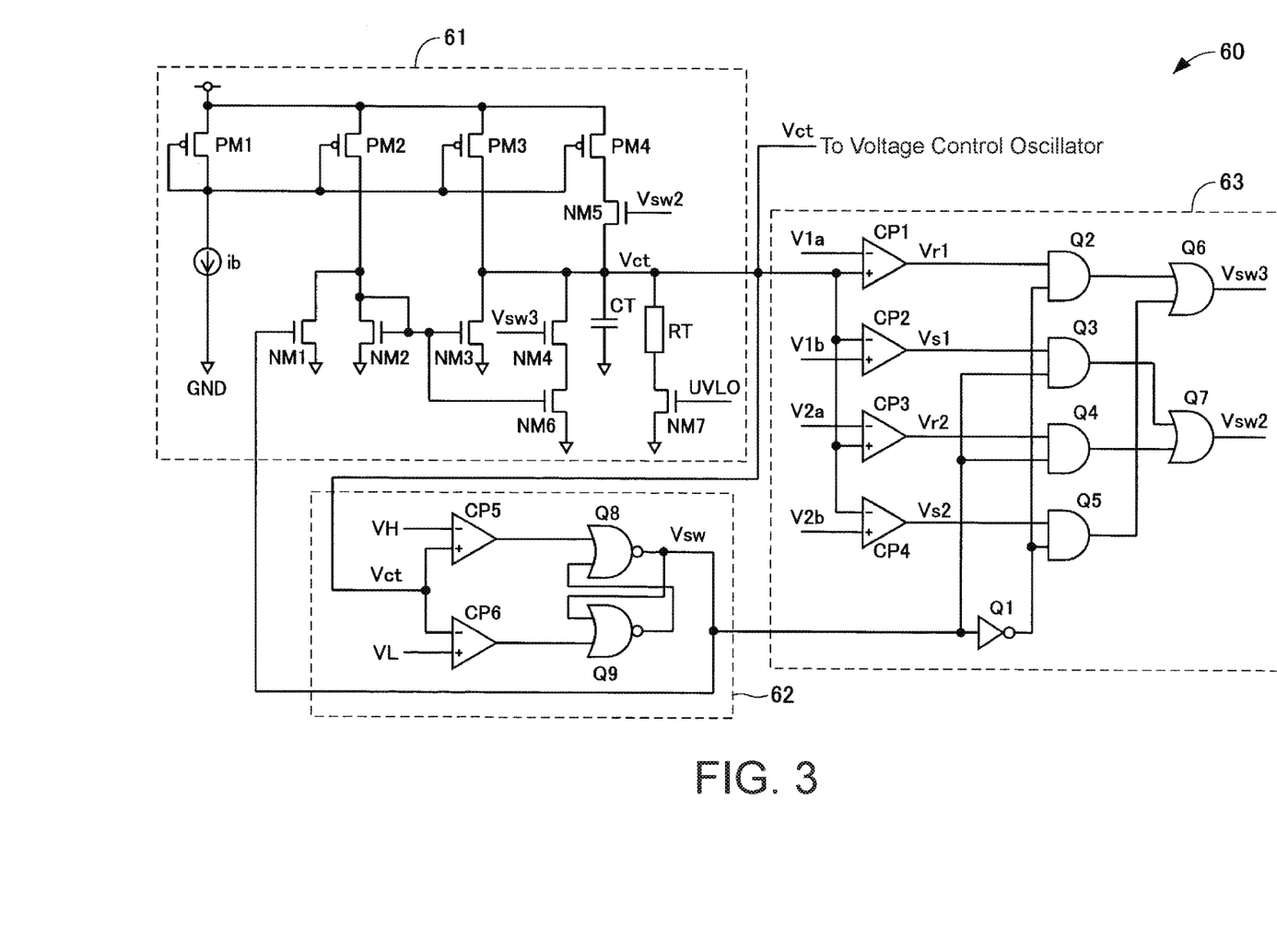
FIG. 3 is a circuit diagram illustrating an example of the configuration of a Hershey's Kiss approximation signal generating circuit.
Figure 4A:
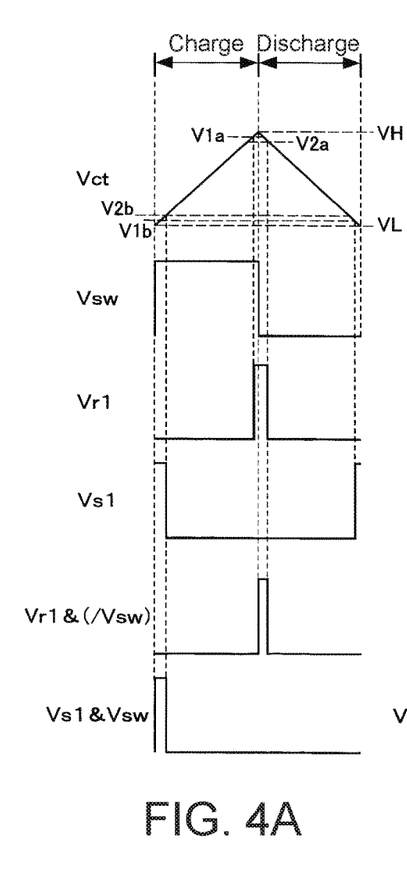
FIGS. 4A to 4C are diagrams illustrating a process of generating a Hershey's Kiss approximation signal, where FIGS. 4A and 4B indicate stages of preparation for slope switch point generation and FIG. 4C indicates a stage of generating an approximation signal.
Figure 4B:
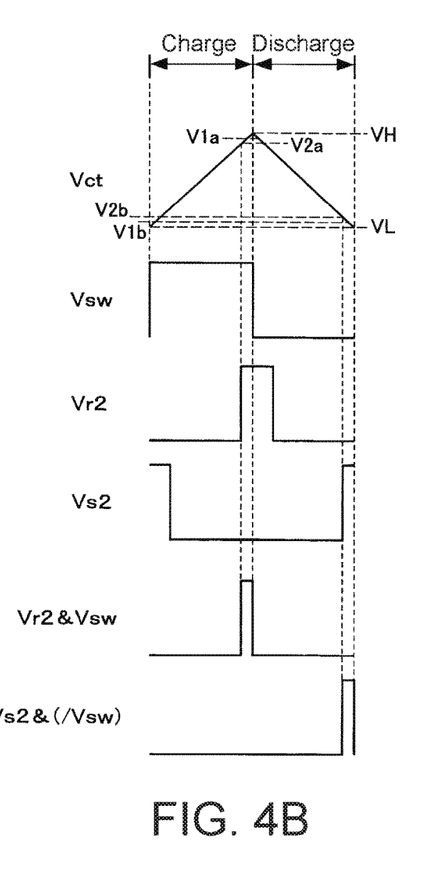
Figure 4C:
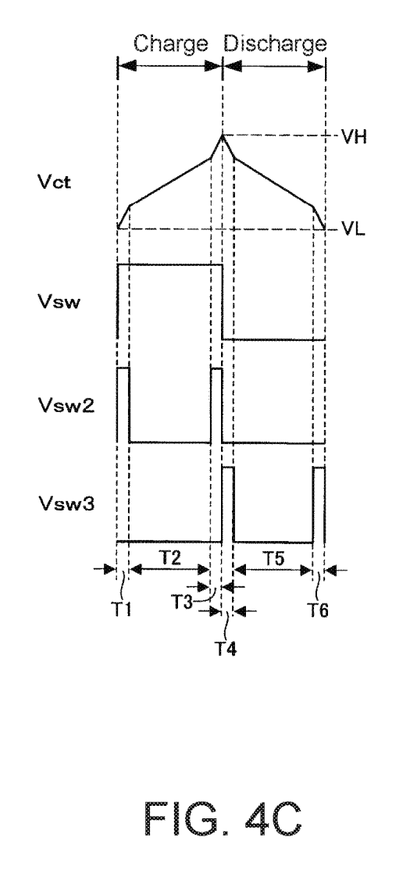

FIG. 3 is a circuit diagram illustrating an example of the configuration of the Hershey's Kiss approximation signal generating circuit 60. FIGS. 4A to 4C are diagrams illustrating a process of generating the Hershey's Kiss approximation signal, where FIGS. 4A and 4B indicate stages of preparation for slope switch point generation and FIG. 4C indicates a stage of generating an approximation signal.

In the oscillator 34, the Hershey's Kiss approximation signal generating circuit 60 that generates the modulating signal includes a triangular wave/Hershey's Kiss approximation signal generating unit 61, a triangular wave generation control unit 62, and a slope switching signal generating unit 63.

The triangular wave/Hershey's Kiss approximation signal generating unit 61 has a circuit configuration in which a circuit that temporarily increases a charge and discharge current is added to a basic triangular wave generating circuit. In other words, the triangular wave/Hershey's Kiss approximation signal generating unit 61 includes four transistors (p-channel MOSFETs) PM1, PM2, PM3, and PM4. The source terminals of the transistors PM1, PM2, PM3, and PM4 are connected to a power supply. The gate terminal and the drain terminal of the transistor PM1 and the gate terminals of the transistors PM2, PM3, and PM4 are connected to one end of a current source ib. Another end of the current source ib is connected to a ground GND. Here, the transistor PM1 and the transistors PM2, PM3, and PM4 constitute a current mirror circuit, and the same current as a current ib from the current source ib is copied and outputted from the drain terminals of the transistors PM2, PM3, and PM4.

The drain terminals of the transistors PM2 and PM3 are connected to the drain terminals of transistors (n-channel MOSFETs) NM2 and NM3, respectively, and the source terminals of the transistors NM2 and NM3 are connected to the ground GND. A current mirror circuit is formed by connecting the gate terminals of the transistors NM2 and NM3 to each other and connecting the drain terminal and the gate terminal of the transistor NM2. However, in this current mirror circuit, a mirror ratio is set to 1:2 so that the current ib can flow in the transistor NM2 and a current twice the current ib (2×ib) can flow in the transistor NM3.

The drain terminal of the transistor PM2 and the drain terminal of the transistor NM2 are also connected to the drain terminal of a transistor (an n-channel MOSFET) NM1, and the source terminal of the transistor NM1 is connected to the ground GND. The gate terminal of the transistor NM1 is connected to the triangular wave generation control unit 62.

The drain terminal of the transistor PM3 and the drain terminal of the transistor NM3 are also connected to one end of a capacitor CT, and another end of the capacitor CT is connected to the ground GND. According to this configuration, a signal Vct rising at a certain slope can be generated by the transistor PM3 charging the capacitor CT with the current ib from the current source ib when the transistor NM3 is off. When the transistor NM3 is on, the transistor NM3 is set so that a current (2×ib) flows as a result of the current mirror circuit, and the current ib flows from the transistor PM3. Accordingly, the current ib is discharged from the capacitor CT. The signal Vct that drops at a certain slope can be generated by the transistor NM3 causing the current ib to discharge from the capacitor CT. In other words, the transistors PM1 to PM3, NM2, and NM3, the current source ib, and the capacitor CT constitute a triangular wave generating unit.

The drain terminal of the transistor PM4 is connected to the drain terminal of a transistor (an n-channel MOSFET) NM5, the source terminal of the transistor NM5 is connected to one end of the capacitor CT, and the gate terminal of the transistor NM5 is connected to the slope switching signal generating unit 63. According to this configuration, when the transistor NM3 is off and the transistor NM5 is on, the capacitor CT is charged by the current ib from the transistor PM3 and the current ib from the transistor PM4, and the signal Vct that rises at a steep slope is generated. In other words, the transistors PM4 and NM5 constitute a charging current adding unit.

The drain terminal of the transistor NM3 is also connected to the drain terminal of a transistor (an n-channel MOSFET) NM4, the source terminal of the transistor NM4 is connected to the drain terminal of a transistor (an n-channel MOSFET) NM6, and the gate terminal of the transistor NM4 is connected to the slope switching signal generating unit 63. The source terminal of the transistor NM6 is connected to the ground GND, and the gate terminal of the transistor NM6 is connected to the gate terminal of the transistor NM2. Accordingly, the transistor NM6 constitutes a current mirror circuit with the transistor NM2. According to this configuration, when the transistor NM3 and the transistor NM4 are on, the capacitor CT is discharged by the currents ib flowing via the transistor NM3 and the transistors NM4 and NM6, and the signal Vct that drops at a steep slope is generated. In other words, the transistors NM4 and NM6 constitute a discharge current adding unit.

One end of the capacitor CT is also connected to one end of a resistor RT, and another end of the resistor RT is connected to the drain terminal of a transistor (an n-channel MOSFET) NM7. The source terminal of the transistor NM7 is connected to the ground GND, and the gate terminal of the transistor NM7 is connected to an output terminal of the undervoltage lockout circuit 32. A UVLO signal that is on when the switching power supply device 100 is started up and shut down and is off during normal operations is inputted. As a result, at the time of startup and shutdown, a discharge circuit constituted of the resistor RT and the transistor NM7 is connected in parallel to the capacitor CT and the electric charge accumulated in the capacitor CT is discharged with certainty, which ensures that the potential of the capacitor CT (the value of the signal Vct) does not become inconstant.

The triangular wave generation control unit 62 includes comparators CP5 and CP6. The signal Vct expressing the charge potential of the capacitor CT is inputted to a non-inverting input terminal of the comparator CP5 and an inverting input terminal of the comparator CP6. A voltage VH defining the maximum potential of the triangular wave to be generated is inputted to the inverting input terminal of the comparator CP5, whereas a voltage VL defining the minimum potential of the triangular wave is inputted to the non-inverting input terminal of the comparator CP6. An output terminal of the comparator CP5 is connected to one input of a NOR gate Q8, and an output terminal of the comparator CP6 is connected to one input of a NOR gate Q9. The NOR gates Q8 and Q9 form an RS flip-flop by connecting an output of the NOR gate Q9 to another input of the NOR gate Q8 and connecting an output of the NOR gate Q8 to another input of the NOR gate Q9. In other words, one input of the NOR gate Q8 that receives the output from the comparator CP5 constitutes a reset input terminal of the RS flip-flop, one input of the NOR gate Q9 that receives the output from the comparator CP6 constitutes a set input terminal of the RS flip-flop, and the output from the NOR gate Q8 constitutes an output of the RS flip-flop.

As a result, when the signal Vct from the capacitor CT is lower than the voltage VL, the output of the comparator CP5 goes to L level and the output of the comparator CP6 goes to H level. As such, the NOR gate Q8 outputs a signal Vsw at H level. When the signal Vct exceeds the voltage VL, the outputs of the comparators CP5 and CP6 go to L level, and thus the output signal Vsw from the NOR gate Q8 stays at H level. When the signal Vct exceeds the voltage VH, the output of the comparator CP5 goes to H level and the output of the comparator CP6 goes to L level. As such, the NOR gate Q8 outputs the signal Vsw at L level. When the signal Vct drops below the voltage VH, the outputs of the comparators CP5 and CP6 go to L level, and thus the output signal Vsw from the NOR gate Q8 stays at L level. When the signal Vct drops below the voltage VL, the output of the comparator CP5 goes to L level and the output of the comparator CP6 goes to H level. As such, the NOR gate Q8 outputs the signal Vsw at H level. In other words, the triangular wave generation control unit 62, outputs the signal Vsw at H level during charging, when the signal Vct rises from the voltage VL to the voltage VH, and outputs the signal Vsw at L level during discharging, when the signal Vct drops from the voltage VH to the voltage VL.

The signal Vsw is inputted to the gate terminal of the transistor NM1 in the triangular wave/Hershey's Kiss approximation signal generating unit 61. When the transistor NM1 is receiving the H level signal Vsw, or in other words, during a charging period, the transistor NM1 turns on, the transistors NM2, NM3, and NM6 are turned off, and a constant current discharge function of the triangular wave/Hershey's Kiss approximation signal generating unit 61 is disabled.

The slope switching signal generating unit 63 includes comparators CP1, CP2, CP3, and CP4. The signal Vct is inputted to non-inverting input terminals of the comparators CP1 and CP3 and inverting input terminals of the comparators CP2 and CP4. A voltage V1a at a set level is inputted to an inverting input terminal of the comparator CP1, a voltage V1b at a set level is inputted to a non-inverting input terminal of the comparator CP2, a voltage V2a at a set level is inputted to an inverting input terminal of the comparator CP3, and a voltage V2b at a set level is inputted to a non-inverting input terminal of the comparator CP4. The set level voltages V1a, V1b, V2a, and V2b will be described in detail later. An output terminal of the comparator CP1 is connected to one input of an AND gate Q2, an output terminal of the comparator CP2 is connected to one input of an AND gate Q3, an output terminal of the comparator CP3 is connected to one input of an AND gate Q4, and an output terminal of the comparator CP4 is connected to one input of an AND gate Q5. Other inputs of the AND gates Q3 and Q4 are connected to an output terminal of the triangular wave generation control unit 62, and other inputs of the AND gates Q2 and Q5 are connected to the output terminal of the triangular wave generation control unit 62 via an inverter Q1. Outputs of the AND gates Q2 and Q5 are connected to an input of an OR gate Q6, and an output of the OR gate Q6 is connected to the gate terminal of the transistor NM4 in the triangular wave/Hershey's Kiss approximation signal generating unit 61 as a signal Vsw3. Outputs of the AND gates Q3 and Q4 are connected to an input of an OR gate Q7, and an output of the OR gate Q7 is connected to the gate terminal of the transistor NM5 in the triangular wave/Hershey's Kiss approximation signal generating unit 61 as a signal Vsw2.

Next, operations of the slope switching signal generating unit 63 will be described with reference to FIGS. 4A to 4C. First, in FIGS. 4A to 4C, the voltage VH is a voltage defining a maximum potential of a triangular wave, the voltage VL is a voltage defining a minimum potential of the triangular wave, and the triangular wave is generated by using the voltages VH and VL to define a potential resulting from the charging/discharging of the capacitor CT.

The voltage V1a inputted to the comparator CP1 at the set level has a slightly lower value than the voltage VH, as indicated in FIGS. 4A and 4B, and the voltage V1b inputted to the comparator CP2 at the set level has a slightly higher value than the voltage VL. The voltage V2a inputted to the comparator CP3 at the set level has a value lower than the voltage V1a and lower than the voltage VH by a prescribed value. The voltage V2b inputted to the comparator CP4 at the set level has a value higher than the voltage V1b and higher than the voltage VL by a prescribed value. As such, a relationship between the set levels is VH>V1a>V2a>V2b>V1b>VL.

Here, the comparator CP1 generates a signal Vr1 by comparing the signal Vct with the voltage V1a. The comparator CP2 generates a signal Vs1 by comparing the signal Vct with the voltage V1b. The comparator CP3 generates a signal Vr2 by comparing the signal Vct with the voltage V2a. The comparator CP4 generates a signal Vs2 by comparing the signal Vct with the voltage V2b.

Next, the AND gate Q2 takes the signal Vr1 and a signal (/Vsw) obtained by logically inverting the signal Vsw from the triangular wave generation control unit 62 using the inverter Q1 (the "/" indicates a reversed signal), and outputs a signal Vr1&(/Vsw) (the "&" indicates a logical product). The AND gate Q3 takes the signal Vs1 and the signal Vsw and outputs a signal Vs1&Vsw. The AND gate Q4 takes the signal Vr2 and the signal Vsw and outputs a signal Vr2&Vsw. The AND gate Q5 takes the signal Vs2 and the signal (/Vsw) and outputs a signal Vs2&(/Vsw). As a result, the signal Vs1&Vsw, which serves as a first signal defining the start of a charge period, the signal Vr2&Vsw, which serves as a second signal defining the end of the charge period, the signal Vr1&(/Vsw), which serves as a third signal defining the start of a discharge period, and the signal Vs2&(/Vsw), which serves as a fourth signal defining the end of the discharge period, are generated.

Next, the OR gate Q7 takes the signal Vs1&Vsw and the signal Vr2&Vsw and outputs the signal Vsw2=(Vs1&Vsw) or(Vr2&Vsw) (the "or" indicates a logical sum). As indicated in FIG. 4C, the signal Vsw2 defines periods T1 and T3 at the start and end of the charge period, where the slope is high, and is inputted to the gate terminal of the transistor NM5 in the triangular wave/Hershey's Kiss approximation signal generating unit 61. As a result, in the periods T1 and T3 at the start and end of the charge period, the transistor NM5 is turned on and the capacitor CT is charged with the current ib from the transistor PM3 and the current ib from the transistor PM4. In a period T2, which is in the middle of the charge period when the transistor NM5 is off, the capacitor CT is charged only with the current ib from the transistor PM3. The result is that the slope in the periods T1 and T3 at the start and end of the charge period is twice the slope in the period T2 in the middle of the charge period.

Meanwhile, the OR gate Q6 takes the signal Vr1&(/Vsw) and the signal Vs2&(/Vsw) and outputs the signal Vsw3= (Vr1&/Vsw)or(Vs2&/Vsw). The signal Vsw3 defines periods T4 and T6 at the start and end of the discharge period, where the slope is high, and is inputted to the gate terminal of the transistor NM4 in the triangular wave/Hershey's Kiss approximation signal generating unit 61. As a result, in the periods T4 and T6 at the start and end of the discharge period, the transistor NM4 is turned on; the current ib is discharged via the transistor NM6, in addition to the current ib discharged via the transistor NM3, from the capacitor CT. In a period T5, which is in the middle of the discharge period when the transistor NM4 is off, only the current ib via the transistor NM3 is discharged from the capacitor CT. The result is that the slope in the periods T4 and T6 at the start and end of the discharge period is twice the slope in the period T5 in the middle of the discharge period.

A linearly-approximated Hershey's Kiss approximation signal is generated by switching the slope at a border between the period T1 at the start of the charge period and the period T2 in the middle of the charge period, a border between the period T2 in the middle of the charge period and the period T3 at the end of the charge period, a border between the period T4 at the start of the discharge period and the period T5 in the middle of the discharge period, and a border between the period T5 in the middle of the discharge period and the period T6 at the end of the discharge period in this manner. The signal Vct, serving as the Hershey's Kiss approximation signal generated by the Hershey's Kiss approximation signal generating circuit 60, is outputted to the voltage-controlled oscillation circuit of the oscillator 34 as the modulating signal. Note that the waveform of the timing chart indicated in FIGS. 4A to 4C has a shape in which response delay of the comparators CP1, CP2, CP3, and CP4 is taken into consideration.

Figure 5:
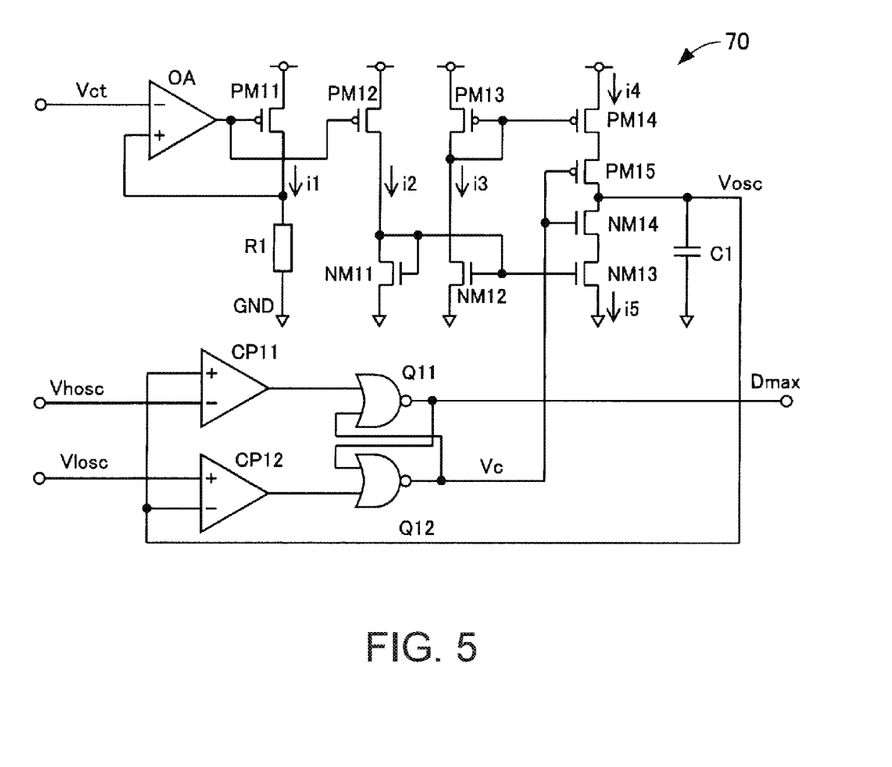
FIG. 5 is a circuit diagram illustrating an example of the configuration of a voltage-controlled oscillation circuit in an oscillator.

FIG. 5 is a circuit diagram illustrating an example of the configuration of the voltage-controlled oscillation circuit in the oscillator.

The voltage-controlled oscillation circuit 70 includes an op-amp OA, comparators CP11 and CP12, transistors (p-channel MOSFETs) PM11 to PM15, transistors (n-channel MOSFETs) NM11 to NM14, a resistor R1, NOR gates Q11 and Q12, and a capacitor C1.

The signal Vct outputted from the Hershey's Kiss approximation signal generating circuit 60 is inputted to an inverting input terminal of the op-amp OA. An output terminal of the op-amp OA is connected to the gate terminals of the transistors PM11 and PM12. The drain terminal of the transistor PM11 is connected to a non-inverting input terminal of the op-amp OA and is connected to one end of the resistor R1. Another end of the resistor R1 is connected to a ground GND.

The drain terminal of the transistor PM12 is connected to the drain terminal of the transistor NM11, and the source terminal of the transistor NM11 is connected to the ground GND. The drain terminal of the transistor NM11 is connected to the gate terminal of the transistor NM11 as well as the gate terminals of the transistors NM12 and NM13, and the source terminals of the transistors NM12 and NM13 are connected to the ground GND. The transistor NM11 constitutes a current mirror circuit with the transistors NM12 and NM13.

The drain terminal of the transistor NM12 is connected to the drain terminal and the gate terminal of the transistor PM13, and to the gate terminal of the transistor PM14; the transistor PM13 constitutes a current mirror circuit with the transistor PM14.

The source terminals of the transistors PM11, PM12, PM13, and PM14 are connected to a power supply terminal.

The drain terminal of the transistor PM14 is connected to the source terminal of the transistor PM15, the drain terminal of the transistor PM15 is connected to the drain terminal of the transistor NM14, and the source terminal of the transistor NM14 is connected to the drain terminal of the transistor NM13. The drain terminals of the transistor PM15 and the transistor NM14 are connected to one end of the capacitor C1, and another end of the capacitor C1 is connected to the ground GND.

The drain terminals of the transistor PM15 and the transistor NM14 are also connected to a non-inverting input terminal of the comparator CP11 and an inverting input terminal of the comparator CP12, respectively. A voltage Vhosc that sets an upper limit on the charge/discharge voltage of the capacitor C1 is inputted to an inverting input terminal of the comparator CP11, and a voltage Vlosc that sets a lower limit on the charge/discharge voltage of the capacitor C1 is inputted to a non-inverting input terminal of the comparator CP12. An output terminal of the comparator CP11 is connected to one input of a NOR gate Q11, and an output terminal of the comparator CP12 is connected to one input of a NOR gate Q12. The NOR gates Q11 and Q12 form an RS flip-flop by connecting an output of the NOR gate Q12 to another input of the NOR gate Q11 and connecting an output of the NOR gate Q11 to another input of the NOR gate Q12. The output of the NOR gate Q12 is connected to the gate terminals of the transistors PM15 and NM14. The output of the NOR gate Q11 constitutes an output terminal of the oscillator 34.

The signal Vct, which has the Hershey's Kiss approximation waveform, is inputted to an inverting input terminal of the op-amp OA that constitutes the voltage-controlled oscillation circuit 70. At this time, the magnitude of a current i1 flowing in the resistor R1 is Vct/R1, based on a virtual short at the input terminal of the op-amp OA. Meanwhile, the transistor PM12 has a common gate terminal with the transistor PM11, and the gate-source voltages are the same; as such, a drain current i2 of the transistor PM12 has a value obtained by multiplying a ratio of the gate width/gate length of the transistor PM12 and the transistor PM11 with the current i1. This applies to currents i3, i4, and i5 flowing in the other transistors PM13, PM14, and NM13 as well.

The output of the NOR gate Q12 that constitutes the RS flip-flop is connected to the gates of the transistor PM15 and the transistor NM14, and an output signal Vc thereof is inputted. The transistor NM14 turns off and the transistor PM15 turns on when the output signal Vc from the RS flip-flop is L level, and thus the capacitor C1 is charged by the current i4 flowing via the transistors PM14 and PM15. The transistor NM14 turns on and the transistor PM15 turns off when the output signal Vc from the RS flip-flop is H level, and thus the current of the current i5 from the capacitor C1 is discharged via the transistors NM14 and NM13.

A triangular wave signal Vosc outputted as a charge voltage of the capacitor C1 is compared with Vhosc and Vlosc (Vhosc>Vlosc) by the comparators CP11 and CP12. In other words, when the output signal Vc from the RS flip-flop is L level, the potential of the triangular wave signal Vosc rises; the output from the comparator CP11 goes to H level at the point in time when that potential exceeds the voltage Vhosc, and the output signal Vc changes to H level. The potential of the triangular wave signal Vosc then drops; the output from the comparator CP12 goes to H level at the point in time when that potential has dropped below the voltage Vlosc, and the output signal Vc once again goes to L level. The oscillation signal Dmax outputted by the oscillator 34 is outputted from the NOR gate Q11 in a form logically inverted relative to the output signal Vc.

Note that in this embodiment, the range of frequency spreading achieved by the Hershey's Kiss approximation waveform signal Vct is ±7% relative to a fundamental wave of 65 kHz for the triangular wave signal Vosc from the voltage-controlled oscillation circuit 70. The switching power supply device 100 therefore operates with the switching frequency in a range of 65 kHz±4.55 kHz. However, the stated ±7% is merely an example, and optimal values can be set, in accordance with noise standards including measurement conditions, by changing circuit constants in the Hershey's Kiss approximation signal generating circuit 60, such as the voltages VH, V1a, V2a, V2b, V1b, and VL, the resistance value of the resistor RT, the current value of the current ib, and so on.

To simplify the descriptions, the stated voltage-controlled oscillation circuit 70 has been described as taking the fundamental wave of the triangular wave signal Vosc as a fixed frequency. However, in actuality, the size of the load is determined by the voltage at the FB terminal, and the fundamental frequency is varied in accordance with the size of the load. Control is carried out so that, for example, the fundamental frequency is set to 65 kHz when the load is heavy, the fundamental frequency is lowered as the load lightens, and burst operations for temporarily stopping the switching operations are carried out at 25 kHz and below.

Furthermore, the embodiment has described a flyback-type switching power supply device, which takes a commercial AC power supply as its input, as an example. However, the present invention is not intended to be limited to this type of switching power supply device, and it goes without saying that the present invention can also be applied in a device whose input is a DC power supply such as a battery, a switching power supply that uses a single inductance rather than transformers, and so on.

It will be apparent to those skilled in the art that various modifications and variations can be made in the present invention without departing from the spirit or scope of the invention. Thus, it is intended that the present invention cover modifications and variations that come within the scope of the appended claims and their equivalents. In particular, it is explicitly contemplated that any part or whole of any two or more of the embodiments and their modifications described above can be combined and regarded within the scope of the present invention.

What is claimed is:

1. A circuit for a switching power supply device that carries out control for generating a prescribed DC voltage by switching a switching element connected to an input voltage, the control control circuit comprising:
   an oscillation circuit that generates a switching signal to turn on and off the switching element; and
   a modulating signal generating circuit that generates and supplies a modulating signal for frequency modulation to the oscillation circuit,
   wherein the oscillation circuit modulates the switching signal in accordance with the modulating signal supplied by the modulating signal generating circuit so as to perform frequency sweep on switching of the switching element, and wherein said modulating signal has a plurality of linear segments that altogether linearly approximates a Hershey's Kiss modulating waveform.

2. The control circuit for the switching power supply device according to claim 1,
wherein the modulating signal generating circuit includes:
a triangular wave generating unit that generates a triangular wave signal by repeating a constant current charge and a constant current discharge of a capacitor;
a slope switching signal generating unit that generates, based on the triangular wave signal, a first signal expressing a prescribed period at the start of a charge, a second signal expressing a prescribed period at the end of the charge, a third signal expressing a prescribed period at the beginning of a discharge, and a fourth signal expressing a prescribed period at the end of the discharge;
a charging current adding unit that, in accordance with the first signal and the second signal, increases a current charging the capacitor so as to increases a slope of the triangular wave in the period at the start of the charge and the period at the end of the charge; and
a discharge current adding unit that, in accordance with the third signal and the fourth signal, increases a current discharged from the capacitor so as to increase a slope of the triangular wave in the period at the start of the discharge and the period at the end of the discharge.

3. The control circuit for the switching power supply device according to claim 2,
wherein the modulating signal generating circuit includes a triangular wave generation control unit that compares a voltage of the triangular wave signal with voltages defining a maximum potential and a minimum potential of the triangular wave so as to output a fifth signal expressing a period in which the capacitor is charged and a period in which the capacitor is discharged, and a circuit that disables the constant current discharge of the triangular wave generating unit upon receiving a signal expressing a period in which the capacitor is charged in the fifth signal from the triangular wave generation control unit.

4. The control circuit for the switching power supply device according to claim 3,
wherein the slope switching signal generating unit includes: first to fourth comparators, each of which compares the voltage of the triangular wave signal with a different set level having a value between the maximum potential and the minimum potential of the triangular wave; a first AND gate that outputs the third signal based on an output signal of the first comparator and a logic reversed signal of the fifth signal; a second AND gate that outputs the first signal based on an output signal of the second comparator and the fifth signal; a third AND gate that outputs the second signal based on an output signal of the third comparator and the fifth signal; a fourth AND gate that outputs the fourth signal based on an output signal of the fourth comparator and the logic reversed signal of the fifth signal; a first OR gate that takes the outputs of the second AND gate and the third AND gate and outputs the first signal and the second signal to the charging current adding unit; and a second OR gate that takes the outputs of the first AND gate and the fourth AND gate and outputs the third signal and the fourth signal to the discharge current adding unit.

5. The control circuit for the switching power supply device according to claim 2, wherein the triangular wave generating unit includes a discharge circuit, connected in parallel to the capacitor, that discharges an electric charge accumulated in the capacitor at startup and at shutdown.

6. The control circuit for the switching power supply device according to claim 1,
wherein the oscillation circuit is a voltage-controlled oscillation circuit, and
wherein said modulating signal is a time-varying voltage signal, and a voltage of each of the plurality of linear segments linearly increases or decreases with time.

7. A switching power supply device, comprising;
a switching element configured to be connected to an input voltage; and
a control circuit that carries out control for generating a prescribed DC voltage by switching the switching element connected to the input voltage,
wherein the control circuit includes an oscillation circuit that generates a switching signal to turn on and off the switching element, and a modulating signal generating circuit that generates and supplies a modulating signal for frequency modulation to the oscillation circuit,
wherein the oscillation circuit modulates the switching signal in accordance with the modulating signal supplied by the modulating signal generating circuit so as to perform frequency sweep on switching of the switching element, and
wherein said modulating signal has a plurality of linear segments that altogether linearly approximates a Hershey's Kiss modulating waveform.

* * * * *

UNITED STATES PATENT AND TRADEMARK OFFICE
CERTIFICATE OF CORRECTION

PATENT NO. : 9,882,496 B2
APPLICATION NO. : 15/258128
DATED : January 30, 2018
INVENTOR(S) : Kenichi Nishijima Page 1 of 1

It is certified that error appears in the above-identified patent and that said Letters Patent is hereby corrected as shown below:

In the Claims

Column 16, Line 54, the text "A circuit" should be changed to -- A control circuit --.

Column 16, Line 57, the text "the control control circuit" should be changed to -- the control circuit --.

Signed and Sealed this
Twenty-seventh Day of March, 2018

Andrei Iancu
*Director of the United States Patent and Trademark Office*